United States Patent
Paul

(10) Patent No.: US 8,595,107 B2
(45) Date of Patent: Nov. 26, 2013

(54) METHOD FOR CONVERTING GENERAL ACCOUNT LIFE INSURANCE TO SEPARATE ACCOUNT LIFE INSURANCE

(75) Inventor: Joseph Edward Paul, West Fargo, ND (US)

(73) Assignee: Midland National Life Insurance Company, Sioux Falls, SD (US)

( * ) Notice: Subject to any disclaimer, the term of this patent is extended or adjusted under 35 U.S.C. 154(b) by 41 days.

(21) Appl. No.: 13/229,333

(22) Filed: Sep. 9, 2011

(65) Prior Publication Data

US 2012/0066006 A1    Mar. 15, 2012

Related U.S. Application Data

(60) Provisional application No. 61/381,253, filed on Sep. 9, 2010.

(51) Int. Cl.
*G06Q 40/00* (2012.01)

(52) U.S. Cl.
USPC ................................................. 705/35; 705/4

(58) Field of Classification Search
USPC .................................................. 705/4, 35–40
See application file for complete search history.

(56) References Cited

U.S. PATENT DOCUMENTS

| 5,806,042 | A | 9/1998 | Kelly et al. | |
|---|---|---|---|---|
| 2009/0164384 | A1* | 6/2009 | Hellen et al. | 705/36 R |

OTHER PUBLICATIONS

Andritsch, Todd A., "Separate Account BOLI Products Available for Community Banks" Hoosier Banker, Aug. 2007 [retrieved from Internet on Jun. 11, 2009] http://findarticles.com/p/articles/mi_qa5381/is_200708_ai_n21297830/, 3 pages.

"Bank-Owned Life Insurance (BOLI)", [retrieved from Internet on Jun. 11, 2009] http://www.investopedia.com/terms/b/boli.asp, 2 pages.

Galbreath, Rob, "The Bottom Line on BOLI (Bank-Owned Life Insurance)", [retrieved from Internet on Jun. 11, 2009] http://www.mraeresources.com/focus/articles/?aid=168, 1 page.

NYLEX Benefits "Bank-Owned life Insurance (BOLI)", [retrieved from Internet on Jun. 11, 2009] http://www.newyorklife.com/cda/0,3254,14223,00.html, 4 pages.

The Northwestern Mutual Life Insurance Company, Bank Owned Life Insurance (BOLI) brochure, 12 pages, Date: Jun. 11, 2009.

Transamerica Retirement Services, "Separate Accounts 101" Brochure, TRS 1708-0407, 6 pages, Date: Aug. 2007.

Waters, John D. et al., "New BOLI Options for Community Banks", Banking Solutions, 1 page, Date: Jun. 2009.

* cited by examiner

*Primary Examiner* — Thu Thao Havan
(74) *Attorney, Agent, or Firm* — Lewis Roca Rothgerber LLP

(57) ABSTRACT

A method is disclosed for converting a third-party owned life insurance policy from being guaranteed by an insurance carrier's general account to a life insurance policy guaranteed by the insurance carrier's separate account. An insurance carrier receives a request from a policy owner to convert the account from being backed by the general account to being backed by a separate account. The insurance carrier transfers cash or assets in an amount equal to the policy value of the life insurance policy from the general account to the separate account. The insurance carrier issues an endorsement to the policy owner amending the policy. In a preferred embodiment, the owner of the third-party life insurance policy is a bank.

7 Claims, 3 Drawing Sheets

INSURANCE COMPANY

ENDORSEMENT

EFFECTIVE DATE OF ENDORSEMENT:

The following provision is added to the policy:

Separate Account

A portion of our assets equal to the policy value is allocated to the separate account for this policy. The assets of the separate account are our property and are not chargeable with liabilities arising out of any other business We may conduct. Policy interests will be established in accordance with the interest rate provision of the policy and credited to the policy value. Policy interest rates will be communicated in writing to the policyowner annually.

This endorsement terminates on the earlier of the following:

1. On the monthly deduction day that falls on or next follows the date we approve your written request; or 2. On the date the policy terminates.

Insurance Company

*Jane Doe*

Secretery

*Fig. 3*

METHOD FOR CONVERTING GENERAL ACCOUNT LIFE INSURANCE TO SEPARATE ACCOUNT LIFE INSURANCE

CROSS-REFERENCE TO RELATED APPLICATIONS

This application claims priority under 35 U.S.C. §119 to provisional application Ser. No. 61/381,253 filed Sep. 9, 2010, herein incorporated by reference in its entirety.

FIELD OF THE INVENTION

This invention relates generally to the administration of life insurance, and more specifically to methods of administering third-party owned life insurance.

BACKGROUND OF THE INVENTION

Banks and other corporations purchase life insurance on employees in order to fund their employee benefit plans, and especially to fund non-qualified deferred compensation (NQDC) plans. When the insurance is purchased by a bank, it is commonly referred to as bank owned life insurance (BOLI), and when it is owned by a different type of corporation, it is sometimes referred to as corporate owned life insurance (COLI). Generally speaking, such third-party owned life insurance can be backed either by the insurance company's general account or by a separate account owned by the life insurance company. The policies backed by the general account are subject to the status and solvency of the insurance company. In other words, they are backed by the full value of the insurance company, but they are also subject to attack by the insurance company's creditors. On the other hand, policies backed by the separate account are subject to the variation of the value of the assets in a separate account, but are not subject to the credit risks of the insurance company. On occasion, owners of the BOLI or COLI policies will desire to convert their insurance from a general account policy to a separate account policy. In the past, this has only been possible through a complicated like-kind exchange procedure that also required consent by the employee being insured.

The present invention provides an improved procedure for converting third-party owned life insurance from a general account policy to a separate account policy.

BRIEF SUMMARY OF THE INVENTION

According to one embodiment the present invention is directed to a method of converting a third-party owned life insurance policy from a general account policy to a separate account policy. An insurance company that has issued a general account policy receives a request from the owner of the policy to convert the policy to a separate account policy. The insurance company issues an endorsement that amends the general account policy to include a provision that assets equal to the policy value are being allocated to a separate account. The insurance company transfers funds from its general account to the separate account equal to the amount of the policy value of the policy. The third-party owner of the general account policy may be a bank or other corporation. According to one embodiment, the assets held in the separate account are all bank-eligible assets. The conversion of the general account policy to a separate account policy may be accomplished without the participation of the insured individual.

BRIEF DESCRIPTION OF THE DRAWINGS

FIG. 3 shows an endorsement used in converting a general account life insurance policy to a separate account life insurance policy according to one embodiment of the present invention.

DETAILED DESCRIPTION OF THE PREFERRED EMBODIMENT

Figure 1:
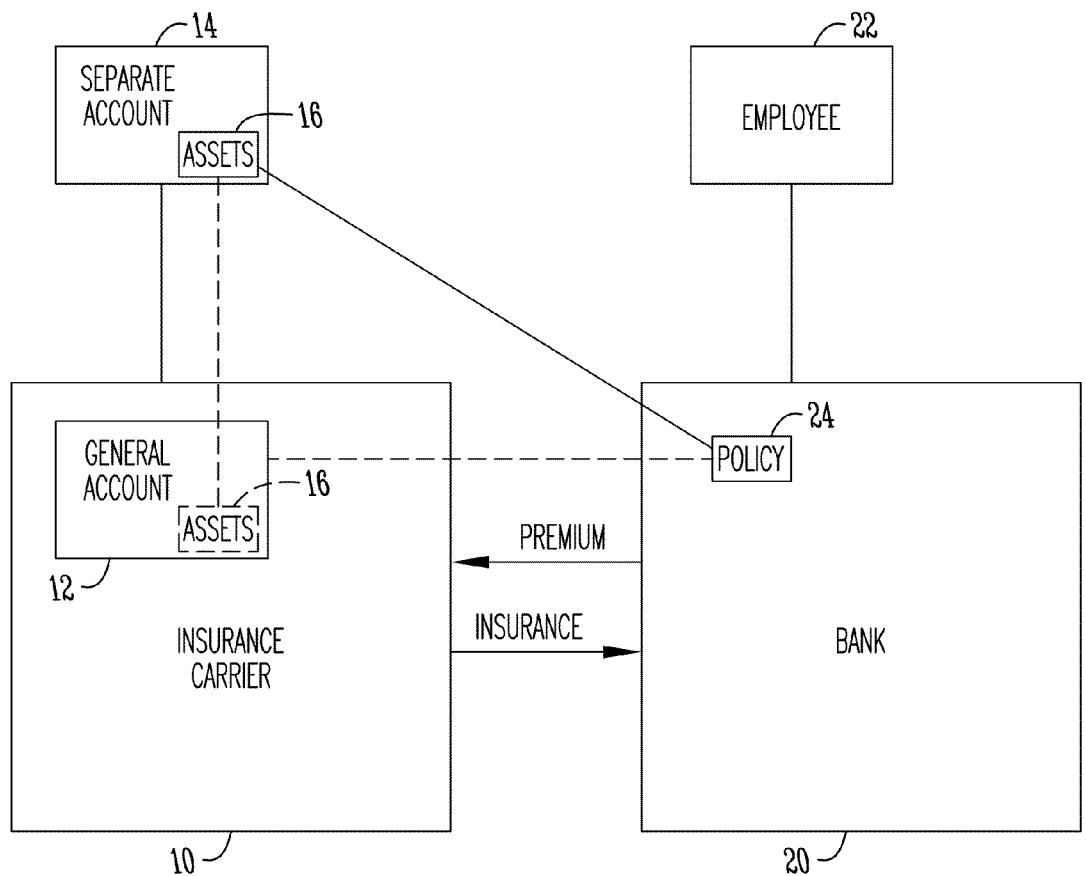
FIG. 1 is a schematic illustrating the relationship between the insurance company and a bank.
Figure 2:
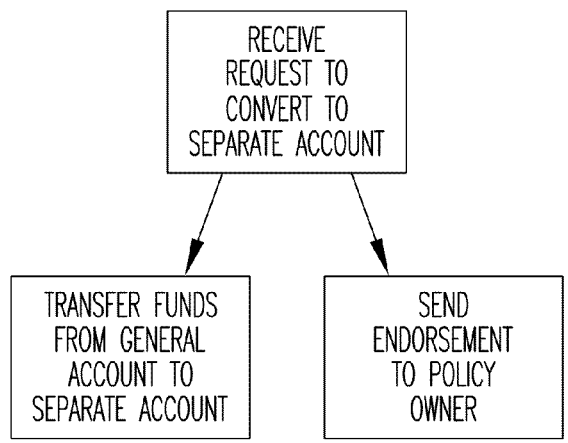
FIG. 2 is a flow chart illustrating a method of converting a general account third-party life insurance policy to a separate account third-party life insurance policy according to one embodiment of the present invention.

FIG. 1 is a schematic showing the relation of several elements according to the present invention. An insurance carrier 10 provides life insurance to a bank 20. The bank 20 has an employee 22 to which it provides benefits, such as deferred compensation and other benefits. In order to fund these benefits the bank 20 has purchased a life insurance policy 24 on the employee 22. Most commonly the policy 24 will be a single premium life insurance contract, although it may be a flexible premium life insurance contract. The policy 24 will have a policy value based on either the premium, less insurance costs and administrative fees, plus any earned interest, or, tabular guarantees in the case of a whole life contract. For the example shown in FIG. 1, the policy 24 is guaranteed by the general account 12 of the insurance carrier 10. The general account 12 of an insurance carrier 10 is an account that includes assets of the insurance carrier 10. Typically the account will be held in a third party bank or similar institution. The insurance carrier 10 bears the risk of a declining value of the assets held in the general account 12; however, the assets in the general account 12 are subject to the claims of creditors for the insurance carrier 10 in the case of insolvency. The insurance carrier 10 may also have a separate account 14 in the same or a different third party bank that contains assets that are specifically used to guarantee life insurance policies. The owner of the policies guaranteed by the separate account 14 bear the risk that assets are insufficient to provide for policy value liabilities for the separate account 14; however, the assets in the separate account 14 are beyond the reach of general creditors in the event of carrier insolvency.

If the bank 20 wishes to convert its policy 24 from being backed by the general account 12 to being backed by the separate account 14, it provides notice to the insurance carrier 10 of its desire. The insurance carrier 10 then transfers cash or assets 16 from the general account 12 to the separate account 14. The cash or assets 16 that are transferred from the general account 12 to the separate account 14 are equal in value to the policy value of the policy 24. The insurance carrier 10 sends an endorsement 100 (see FIG. 3) to the bank 20. The endorsement 100 is a written communication that may be in electronic form, or preferably on paper. The endorsement 100 communicates to the bank 20 that cash or assets equal to the policy value have been transferred to the separate account 14. The endorsement 100 further indicates that the separate } account 14 is not chargeable with liabilities arising out of any other business insurance carrier 10 may conduct. The endorsement 100 may also communicate that interest will be credited to the policy value in accordance with the policy 24. Thereafter, the policy 24 has been converted into a separate account policy and is guaranteed by the separate account 14 rather than the general account 12.

According to one embodiment, all of the assets contained in the separate account 14 will be assets that are appropriate for a bank to own. Preferably, the request to convert the policy 24 from a general account policy to a separate account policy should come from the bank 20, and should not be initiated or suggested by the insurance carrier 10.

Figure 4:
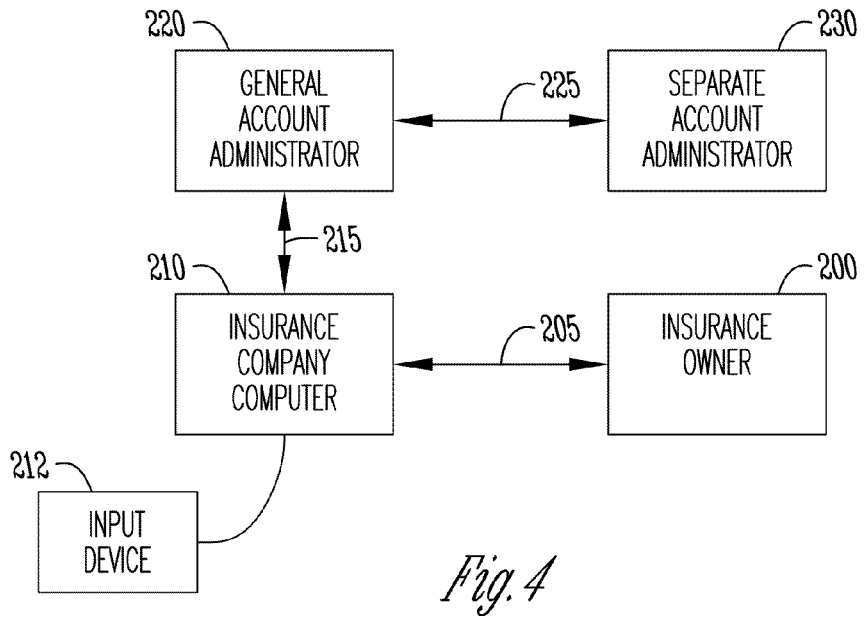
FIG. 4 shows a system for converting a general account life insurance policy to a separate account life insurance policy according to one embodiment of the present invention.

FIG. 4 shows a system that can be used to convert a general account life insurance policy to a separate account life insurance policy according to one embodiment of the present invention. An insurance company computer 210 is adapted to receive an instruction to convert a general account backed life insurance policy to a separate account backed life insurance policy. While it is identified herein as an insurance company computer 210, it should be appreciated that the computer 210 need not be owned by an insurance company nor physically located on insurance company property. Furthermore, the computer 210 could be a single computer, a network of computers, or a cloud-type arrangement. The computer 210 should have a tangible computer readable medium that can be read by a computer processor for storing data and executable computer code, and a computer processor for executing the computer code.

The insurance company computer 210 is adapted, for example by being programmed with executable code, for receiving an instruction to convert a general account backed life insurance policy to a separate account life insurance policy. The instruction may come from an insurance owner 200 directly via a communication connection 205, or, may be input by an insurance company representative via an input device 212 associated with the computer 210. The communication connection 205 could be a computer network, such as the Internet. Password and other security protections may be used to control access to the computer 210 and to assure that the insurance owner 200 is authorized to alter the insurance policy from a general account to a separate account backed policy. The input device 212 could be a keyboard, or other device used by an insurance company representative to provide an input to the computer 210 to initiate a change in the insurance policy from a general account backed policy to a separate account backed policy.

The computer 210 is adapted to calculate a value of the life insurance policy. The policy value could be based on either the premium, less insurance costs and administrative fees, plus any earned interest, or, tabular guarantees in the case of a whole life contract. The computer 210 is programmed to provide an output that instructs the general account administrator 220 to transfer assets, for example account value, from the general account to a separate account. The general account administrator will typically be a bank or other savings institution. The output may be an electronic or other signal that is transmitted to the general account administrator 220 via the Internet or other connection 215. Alternatively, the output could be a hard copy notice that is physically delivered to the general account administrator 220. As a further alternative, an audio signal could be generated by the computer 210 and transmitted via telephone lines 215. In any event the determined value and fact of instruction to the general account administrator 220 will generally be recorded and saved on the computer readable medium of the computer 210.

The general account administrator 220, after receiving the instruction to transfer assets, will take the step necessary to transfer assets of the specified amount to the separate account. The separate account administrator 230 may be the same or a different entity than the general account administrator 220. The general account administrator 230 will receive the funds or other assets equal to the value of the life insurance policy and add them to the general account.

The insurance company computer 210 will cause an endorsement notice to be generated. The endorsement notice provides notice to the insurance owner that the policy is now backed by a separate account, rather than by the general account. The endorsement notice may be a hard copy (see for example FIG. 3) or an electronic notice. Preferably all of this is accomplished without the need to inform or seek consent from the employee whose life is being insured.

Figure 5:
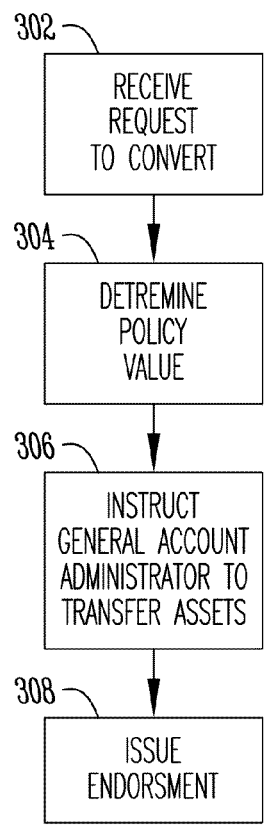
FIG. 5 is a flow chart illustrating a method for converting a general account life insurance policy to a separate account life insurance policy according to one embodiment of the present invention.

FIG. 5 illustrates a method for converting a third-party life insurance policy, such as a COLI or BOLI, from a general account backed policy to a separate account backed policy. According to this method, an insurance provider receives a request 302 from the insurance owner to convert the policy from a general account policy to a separate account policy. Preferably this request is initiated entirely by the policy owner with prompting or request by the insurance provider. Upon receiving the request, the insurance provider, typically using a computer adapted to receive an input instructing it to convert the policy, will demine a value 304 for the insurance policy. The policy value could be based on either the premium, less insurance costs and administrative fees, plus any earned interest, or, tabular guarantees in the case of a whole life contract. The next step 306 is to provide an instruction to the general account administrator to transfer assets equal in value to the policy value from the general account to the separate account. This step 306 may also be performed using a computer programmed to initiate the instruction. Finally, an endorsement is issued 308 to the insurance owner giving notice of the change in the policy.

It should be appreciated while the above description relates to third-party life insurance owned by banks, the method is well-suited for use in association with other third-party owners of life insurance.

What is claimed is:

1. A computer-readable storage device for administering a third-party life insurance policy, the computer-readable storage device containing a set of instructions that causes a computer to perform a process comprising:
   receiving an instruction from an owner of the third-party life insurance policy to convert the life insurance policy from a general account policy to a separate account policy;
   calculating a policy value of the life insurance policy; and
   generating an instruction to a general account administrator to transfer assets from the general account to a separate account in an amount corresponding to the policy value.

2. The computer-readable storage device of claim 1, wherein the process further comprises generating an endorsement providing notice that the policy has been changed from a general account policy to a separate account policy.

3. The computer-readable storage device for administering a third-party life insurance policy according to claim 2, wherein the process further comprises communicating the endorsement notice to the owner.

4. The computer-readable storage device for administering a third-party life insurance policy according to claim 1, wherein the owner is a bank.

5. The computer-readable storage device for administering a third-party life insurance policy according to claim 4, wherein all of the assets in the separate account are bank-eligible assets.

6. The computer-readable storage device for administering a third-party life insurance policy according to claim 1, wherein the process occurs without a like-kind exchange.

7. The computer-readable storage device for administering a third-party life insurance policy according to claim 1, wherein the request is initiated by the owner without any prompting by the carrier.

* * * * *